US008583779B2

(12) United States Patent
Meir et al.

(10) Patent No.: US 8,583,779 B2
(45) Date of Patent: Nov. 12, 2013

(54) ROOT CAUSE ANALYSIS APPROACH WITH CANDIDATE ELIMINATION USING NETWORK VIRTUALIZATION

(75) Inventors: Gil Meir, Gan Hayyim (IL); Zohar Etzioni, Tel Aviv (IL); Gadi Lifshitz, Rishon Le-Zion (IL); Liah Kor, Tel Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 1241 days.

(21) Appl. No.: 11/821,220

(22) Filed: Jun. 21, 2007

(65) Prior Publication Data

US 2008/0114581 A1 May 15, 2008

(51) Int. Cl.
*G06F 15/16* (2006.01)
(52) U.S. Cl.
USPC .......................................... 709/224; 709/202
(58) Field of Classification Search
USPC .................................................. 709/224, 202
See application file for complete search history.

(56) References Cited

U.S. PATENT DOCUMENTS

| 5,325,522 | A | 6/1994 | Vaughn | |
|---|---|---|---|---|
| 5,408,218 | A | 4/1995 | Svedberg et al. | |
| 6,732,153 | B1 | 5/2004 | Jakobson et al. | |
| 7,039,921 | B2 | 5/2006 | Shah et al. | |
| 2001/0039577 | A1* | 11/2001 | Barkai et al. | 709/223 |
| 2003/0169470 | A1 | 9/2003 | Alagar et al. | |
| 2003/0195959 | A1 | 10/2003 | Labadie et al. | |
| 2005/0015667 | A1* | 1/2005 | Aaron | 714/25 |
| 2005/0099419 | A1* | 5/2005 | Castonguay et al. | 345/420 |
| 2005/0207376 | A1* | 9/2005 | Ashwood-Smith et al. | 370/338 |
| 2007/0053283 | A1 | 3/2007 | Bidwell et al. | |
| 2007/0121486 | A1* | 5/2007 | Guichard et al. | 370/216 |
| 2008/0091803 | A1* | 4/2008 | Liu | 709/223 |
| 2008/0288821 | A1* | 11/2008 | Aaron | 714/26 |
| 2008/0316213 | A1* | 12/2008 | Eagen et al. | 345/474 |

FOREIGN PATENT DOCUMENTS

| WO | WO 99/20034 | 4/1999 |
|---|---|---|
| WO | WO 02/086750 A1 | 10/2002 |

OTHER PUBLICATIONS

Canada 2,565,528, Office Action dated Mar. 4, 2009, 2 pgs.
Current Claims, dated Jul. 7, 2009, pp. 18-23.
European Patent Office, "Search Report", in application No. 05740158.0-1244, dated Dec. 7, 2012, 3 pages.

(Continued)

*Primary Examiner* — Thomas Dailey
*Assistant Examiner* — Ebrahim Golabbakhsh
(74) *Attorney, Agent, or Firm* — Hickman Palermo Truong Becker Bingham Wong LLP

(57) ABSTRACT

Root cause analysis in a communication network includes eliminating candidate events using a computer-implemented method, comprising creating a virtual network model that describes nodes and links of the network at a plurality of time periods; receiving from the network a first event that indicates a problem in the network; receiving a set of second events comprising candidates for a root cause of the first event; determining a network topological indicator from the first event; determining a network implication of the first event based on the topological indicator; based on the network implication and a time value of the first event, retrieving data from the virtual network model that indicates a path between nodes associated with the first event at a time at which the first event occurred; removing, from the set of second events, all events that are not on the path between devices associated with the first event.

20 Claims, 9 Drawing Sheets

100 System

(56) References Cited

OTHER PUBLICATIONS

Current Claims in European application No. 05740158.0-1244, dated Dec. 2012, 3 pages.

European Patent Office, "Search Report", in application No. 05 740 158.0-1853, dated Mar. 21, 2013, 7 pages.

Current Claims in application No. 05 740 158.0-1853, dated Mar. 2013, 3 pages.

* cited by examiner

Fig. 9

```
Algorithm 0.0.1: ELIMINATION ALGORITHM(G=(V,E), S⊆E, s∈ V, d∈ V)

P ← p₁...pₙ list of all paths in G from s to d

Aᵥ ← {∀v ∈ V : Aᵥ = list of vertices reachable from v through a path with no red edges} for each p ∈ P
    do ⎰ v ← first vertex in p
       ⎱ while v not last vertex in p
              do ⎰ for removalCandidate ← last vertex on p downto v
                 ⎱     do ⎰ if Aᵥ contains removalCandidate
                            ⎱    then ⎰ Remove from p all vertices between v and removalCandidate
                                       ⎱ break for loop
                    v ← next vertex in p for each e=(v₁,v₂) ∈ S
           do ⎰ if (p contains e) and (A_{v1} not contains v₂)
              ⎱    then {Add e to R (e can not be eliminated!)
```

ROOT CAUSE ANALYSIS APPROACH WITH CANDIDATE ELIMINATION USING NETWORK VIRTUALIZATION

RELATED APPLICATION

This application is generally related to: U.S. patent application Ser. No. 11/788,615, of Gil Meir et al., entitled "Root Cause Analysis in a Telecommunications Network", filed Apr. 20, 2007, and application Ser. No. 10/965,413, filed Oct. 13, 2004, entitled "Method and apparatus for generating diagnoses of network problems," of Petre Dini et al., and application Ser. No. 10/924,702, filed Aug. 23, 2004, entitled "Method and Apparatus for Correlating Events in a Network," of Masum Hasan et al., the entire contents of which are incorporated by this reference for all purposes as if fully set forth herein.

TECHNICAL FIELD

The present disclosure relates generally to network communications, and specifically to managing communication networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Some network management systems implement a data model of the managed network, in which programmatic objects represent network elements such as routers and switches, as well as links between the network elements. Other network management systems implement a network management function known as root cause analysis. Typically, a network problem has caused observable changes in attributes and states of entities in the network. As a result, a plurality of events may be emitted by one or more source entities in the network that happen to observe the attribute changes and the state changes caused by the problem.

Under some approaches, root cause analysis may be performed using causality graphs constructed by the events collected. If such approaches converge to a solution within a finite amount of time, the constructed graphs may indicate root causes for problems in the physical network. The existing techniques for root cause analysis, such as those constructing causality graphs using events as input, may take an inordinately long time to converge or fail to converge at all, especially when the number of the events is large. In addition, the techniques may not robustly deal with a situation where key events are missing. Since events are typically collected using unreliable transport protocols such as syslog or a trap mechanism of Simple Network Management Protocol (SNMP), some key events may not reach the network management system.

Some existing techniques configure a time window to disqualify (or remove) all the events outside the window from the root cause analysis for efficiency purposes. However, because network problems and their symptoms propagate at different rates and appear at different times in different locations of the physical network, it is often difficult to configure such a time window properly to realize an objective of excluding irrelevant events while, at the same time, including relevant events.

The problem of finding the cause for an event in the network can be viewed as a search problem. The search can be bounded by time to form a time window in which the cause must exist. However, the search space may be unduly large.

In one prior approach exemplified by software products from IBM Micromuse, an RCA engine performs single hop root cause analysis. Single hop RCA means that the product will not identify a root cause that resides more than one hop from the symptom. For example, if a link goes down, and causes the loss of BGP neighbors in routers which are more than a single hop from the devices connected by that link, Micromuse is unable to detect that the link down is the root cause for the loss of BGP (Border Gateway Protocol) neighbors. In another approach exemplified by EMC SMARTS, a model-based statistical mechanism and a definition language-codebook approach are used.

BRIEF DESCRIPTION OF THE DRAWINGS

In the drawings:

FIG. 9 illustrates computer program pseudo-code that may be used as the basis of an implementation of the process herein may be implemented in computer program code.

DESCRIPTION OF EXAMPLE EMBODIMENTS

Figure 1:
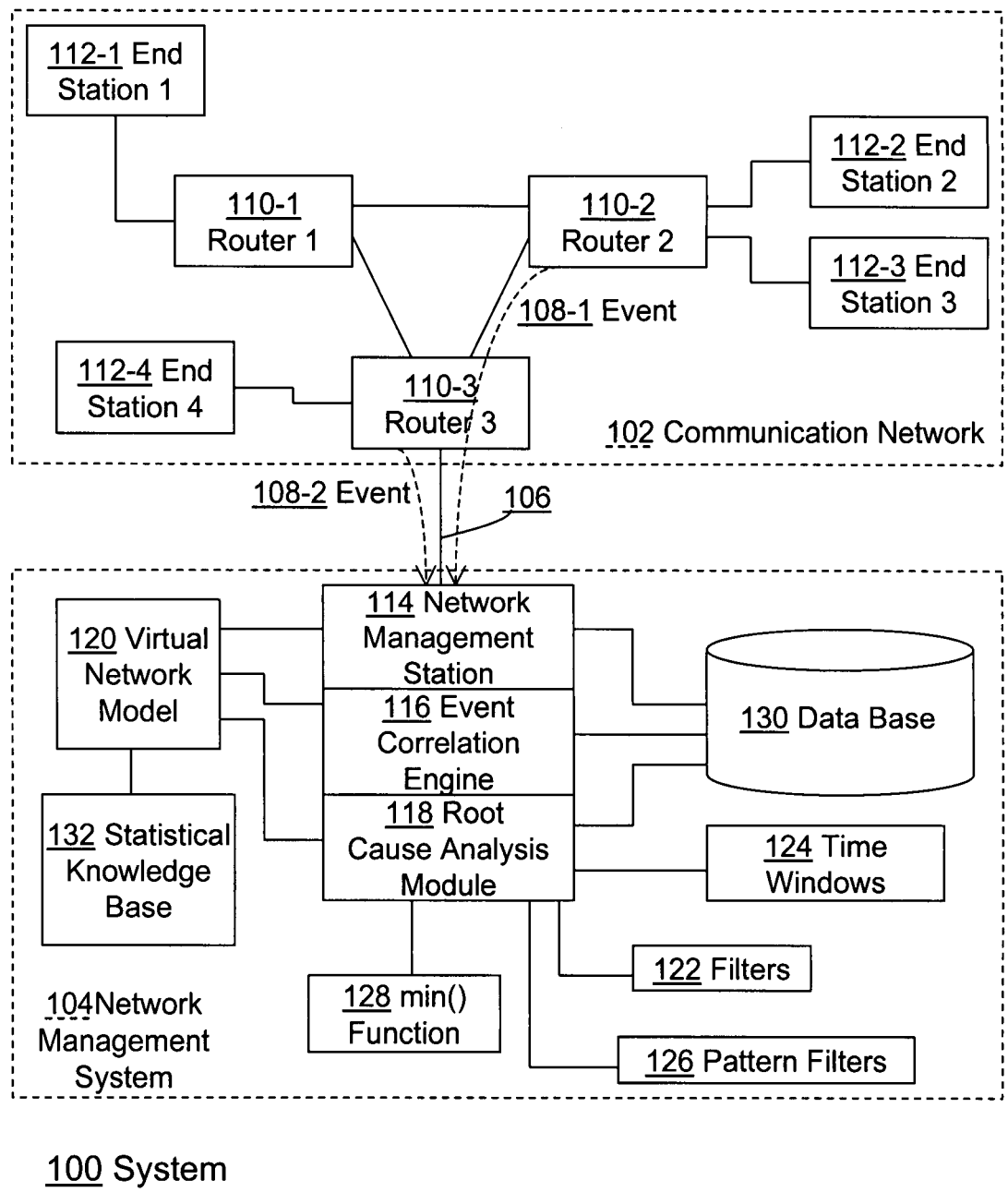
FIG. 1 illustrates an example system operable to perform root cause analysis in a communication network.

Techniques for performing root cause analysis in a communication network are described. In the following description, for the purposes of explanation, numerous specific details are set forth in order to provide a thorough understanding. It will be apparent, however, to one skilled in the art that certain specific details are not necessary. In other instances, well-known structures and devices are shown in block diagram form in order to avoid unnecessarily obscuring the invention.

Embodiments are described herein according to the following outline:

1.0 General Overview
  2.0 Structural and Functional Overview
    2.1 Root Cause Analysis Approach
    2.2 Candidate Elimination Based On Network Virtualization
  3.0 Performing Root Cause Analysis in a Communication Network
    3.1 Example Operations
    3.2 Additional Features and Alternative Embodiments
  4.0 Root Cause Candidate Elimination
  5.0 Implementation Mechanisms-Hardware Overview
  6.0 Extensions and Alternatives
  1.0 General Overview In one embodiment, root cause analysis in a communication network includes eliminating candidate events using a computer-implemented method, comprising creating a virtual network model that describes nodes and links of the network at a plurality of time periods; receiving from the network a first event that indicates a problem in the network; receiving a set of second events comprising candidates for a root cause of the first event; determining a network topological indicator from the first event; determining a network implication of the first event based on the topological indicator; based on the network implication and a time value of the first event, retrieving data from the virtual network model that indicates a path between nodes associated with the first event at a time at which the first event occurred; removing, from the set of second events, all events that are not on the path between devices associated with the first event.

In one feature, the virtual network model comprises a directed acyclic graph. In another feature, the topological indicator specifies that a device is unreachable or a BGP neighbor is lost.

A further feature comprises translating the first event to a source point and a destination point in the virtual network model, wherein the destination point is not reachable in the network from the source point.

In yet another feature, each of the second events represents a broken edge of the graph. In still another feature, the virtual network model comprises a directed acyclic graph, further comprising translating the first event to a source point and a destination point in the virtual network model, the destination point is not reachable in the network from the source point, and the retrieving and removing includes processing all paths in the graph from the source point to the destination point.

In these approaches, network topology information stored in the virtual network model provides a series of snapshots of the nodes, links and paths in a real network at various points in time. Using data in the virtual network model, in combination with topological information obtained from a given event, enables a root cause analysis system to eliminate candidate events by determining that certain events could not have been the root cause of the given event based on nodes, links and paths that existed in the network at the time that the given event occurred.

In various embodiments, the virtual network model may be created and stored, in a memory and may use managed objects to represent network infrastructure elements, end stations, and links. In some embodiments, the virtual network model accurately models the network and enables determining how an actual data packet traverses the network at a given time.

Thus, unlike other network management models that do not model communication networks at a level enabling determining how an actual data packet traverses the networks, the approach herein offers accuracy because it considers accurate topological information in the virtual network model.

The approach herein can also be easily extended to support new scenarios. The approach can operate when duplicate values exist in the network, such as duplicate IP addresses, duplicate VLAN IDs, etc. For example, when a network management module such as an event correlation engine receives multiple events that have the same VLAN ID but originate from different routers or switches, or have different time stamps, the events may be addressed differently by the network management module. For example, the event correlation engine may correlate the events with their respective locations in the communication network and apply location-aware filters, such as those incorporating topological information maintained in the virtual network model, to the events. In an embodiment, filters may be used to address multiple different kinds of duplication.

In an embodiment, the root cause analysis approach herein is scalable to handle a large amount of events sent to a management system, resilient to missing events (events which are not reported), or spurious events, and can easily be adjusted to support different network scenarios or configurations.

In other embodiments, a method may be implemented by a computing device for performing root cause analysis in a communication network.

In some embodiments, the techniques for performing root cause analysis in a communication network described herein may be implemented using one or more computer programs executing on a network infrastructure element, such as a switch, a router, an end station, that is established within the communication network or a network separate and outside the communication network. In some embodiments, the techniques described herein may be implemented by an appliance computer system that is operatively and/or communicatively coupled to a network infrastructure element, such as a switch, a router, and an end station. In some embodiments, the techniques described herein may be implemented on a host computer system that is communicatively connected to the communication network. Thus, the embodiments described herein are to be regarded in an illustrative rather than a restrictive sense.

2.0 Structural and Functional Overview 2.1 Root Cause Analysis Approach

In an embodiment, the techniques disclosed herein may be implemented by one or more computing devices to support performing root cause analysis.

The computing devices each may be any type of computing device. Examples of computing devices may include but are not limited to a switch, a router, an end station, etc., that collects event information from a communication network. The communication network may be any type of communication network. Examples of communication network may include, but are not limited to, those networks comprising switches, routers and end stations.

In some embodiments, support for root cause analysis may be implemented as a part of a network management system. The network management system may create and maintain a network management model that corresponds to a physical network.

The network management model may be constructed based on logical relationships or statistical information relating to entities in the physical network. The logical relationships may be inheritance relationships (e.g., a general type of device, for example, a router, versus a specific type of device, a specific-model router, within the general type) or containment relationships (e.g., a device, for example, a router, that contains sub-devices or modules such as line cards, blades, memory, disk, a particular type of application, etc.). The statistical information, which may be used to populate data in the network management model, may include information about how many instances of a particular device type are currently deployed in the network and what attributes of each such device or its hardware and software modules currently are or historically were. In an embodiment, the network management model represents not only the containment information and the statistical information, but also information relating to operations related to the data-plane of devices, such as routing, switching, etc. Particularly, the network management model represents and stores accurate topological information about the physical network to such an extent that the model can be used to determine how data packets comprising events actually travel in the physical network.

In an embodiment, the root cause analysis uses information of the network management model (including the accurate topological information of the physical network) to determine a root cause for an observable problem.

The problem of root cause analysis can be stated as follows. For every event e detected by the management system, its root cause event e' is identified. The events e and e' can be reported by distinct network infrastructure elements, and events e and e' can both occur and be detected asynchronously.

As illustrated in FIG. 1, the system 100 comprises an example communication network 102 and an example network management system 104, as previously described. Both the communication network 102 and the network management system 104 are operatively coupled with each other through a link 106. Over the link 106, events 108 generated by network elements in the communication network 102 can be collected by the network management system 104.

In an embodiment, the network elements that generate the events 108 are network infrastructure elements (such as routers 110, switches, end stations 112, servers, etc., and links there between). In an embodiment, the events may first be generated by either the network infrastructure elements or any hardware and/or software modules contained therein, subsequently emitted by the network infrastructure elements towards a destination using syslog, SNMP or any other protocols that can be used for sending events, and finally collected by the destination such as the network management system 104.

Some of the events 108 collected may indicate problems in the network 104, some of the events 108 may indicate root causes of the problems in the network, and some of the events 108 may be unrelated to the problems or may only indicate symptoms or secondary problems.

Problems indicted by the events 108 may be local or non-local. A local problem may be related to a specific network element, or hardware and/or software module contained therein. In some embodiments, binary or textual information contained in an event indicating a local problem also specifies what network element or its component module(s) is affected by the problem.

A non-local problem may be related to more than one network element. For example, a non-local problem may affect a link between two network elements, or even affect a path over two or more network elements. Sometimes, a non-local problem may even be global within the communication network, affecting a substantial number of network elements. Like an event indicating a local problem, an event 108 indicating a non-local problem also specifies identification information about the network elements or their component modules, in accordance with some embodiments. For example, an event 108 may identify a source (e.g., an IP address identifying a network element) and/or a destination (e.g., another IP address identifying another network element) for a path that is affected by a problem described by the event.

The network elements in the communication network 102 may comprise one or more network infrastructure elements each of which may comprise one or more software and hardware modules. As illustrated in FIG. 1, the network 102 comprises three routers 110 (1 through 3), four end stations 112 (1 through 4), and links between them. For the purpose of illustration, an event, such as an Event 1 (108-1), may be generated by Router 2 (110-2). The Event 1 traverses through Router 3 (110-3) towards the Network Management System 104 since Router 2 does not directly interface with the Network Management System 104. Another event, say Event 2 (108-2), is generated by Router 1 (110-3). The Event 2 may be directly forwarded to the Network Management System since Router 2 is directly connected with the Network Management System 104, as illustrated. Thus, through the link 106, various events occurred in the communication network 102 may be collected by the network management system 104.

For purposes of illustration, the network management system 104 may comprise a network management station 114 that directly interfaces with Router 3 through the link 106, and an event correlation engine 116 that may be used to identify a subset of the received events 108 as candidates for a root cause of a problem indicated by a particular event 108.

In some embodiments, the network management station 114 may implement some lower layers (e.g., protocol layer, mediation layer, element management layer, fault management, configuration management layer, accounting management, performance management, security management, etc.) for the network management system 104 and be capable of communicating with various network elements in the communication network 102 using a variety of protocols including any protocol that is used for event collection.

In some embodiments, the event correlation engine 116 may be built on top of one or more of the previously mentioned lower layers of the network management system 104. In addition to collecting the events 108, the network management station 114 may use the link 106 for other purposes such as monitoring status or performing actions vis-à-vis the network elements in the communication network 102.

In some embodiments, the event correlation engine 116 may comprise a root cause analysis module 118. In other embodiments, the root cause analysis module 118 may be a separate module working with the event correlation engine 116 to perform root cause analysis for a problem occurred in the communication network 102.

In an embodiment, the events 108 received from the communication network 102 may be normalized using a virtual network model 120 (which is an example embodiment of the network management model discussed in the earlier part of this section). Each of the events 108 may be associated with managed objects in the virtual network model 120. Location information embedded in an event 108 may be determined using the topological information maintained in the virtual network model 120. In various embodiments, the normalization and the association of the events may be performed by any of the network management station 114, the event correlation engine 116, and the root cause analysis module 118 using the virtual network model 120. Thus, the events 108 actually generated in the communication network 102 result in event objects associated with virtual network model objects representing network elements or hardware and software modules contained therein.

The virtual network model 120 that accurately represents the communication network 102 may comprise managed objects that represent various entities in the communication network 102. The managed objects in the model may be implemented, for example, as data structures. The entities in the network may be network infrastructure elements, links, paths, software, firmware, hardware or a combination thereof, for example, routers 110, switches, end stations 112, links, etc. Attributes or a state of a managed object in the model may be computed or derived based on attributes and a state of a corresponding entity in the network. Attributes or states relating to the network (or any of the entities therein) may be viewed through viewing attributes or states relating to the model (or any of the managed objects therein). Similarly, actions upon the network (or any of the entities therein) may be performed through performing actions upon the model (or any of the managed objects therein).

To accurately represent the communication network 102 and its topology, the network management system 104 may collect not only management-related information from the communication network 102, but also topological information including data plane information, routing tables, etc., that enables, for example, determining how many data packets may traverse within the communication network 102 and counting how many hops from one location (say a network element) to another (say another network element), determining how close in the topology a first location is with respect to another location or a link or a path, and determining whether a particular location (say a network element that emits an event) is on a particular path between a source and a destination.

To maintain the virtual network model 120, the network management system 104 may use a polling mechanism, an event-driven mechanism, or a combination thereof. With the polling mechanism, the attributes or states relating to the communication network 102 (or any of the entities therein) are polled from the network infrastructure elements (e.g., the router 110-1) in the communication network 102 from time to time. The attributes or states polled from the communication network 102 are used to compute or derive the corresponding attributes and states relating to the model (or any of the managed objects therein).

With the event-driven mechanism, the network management system 104 may wait for and receive events 108 emitted by source entities in the communication network 102. An event 108 may be associated with one or more entities. A change in any of states or attributes of the one or more associated entities may trigger a related source entity to emit the event. Associated entities whose attribute or state changes trigger emissions of events are typically identified by the events in their contents (or in binary format and/or textual format). Based on the information represented by the events 108, the network management system 102 may compute or derive attributes and states of managed objects (in the model) that correspond to the associated entities identified in the events 108. In some situations, the network management system 104 may, upon receiving certain events 108 or before or after performing some control actions, invoke the polling mechanism to retrieve attributes or states of the communication network 102 (or attributes or states of the entities therein).

The source entities that emit the events are typically network infrastructure elements such as routers 110 or switches, end stations 112 (which may further include printers, personal computers, wireless data processing devices, and server), etc. Any of the network infrastructure elements can generate events at any time during operation. Additional entities may be identified in an event 108 in its binary and/or textual formatted information. Such additional entities may be any type of entity, including but not limited to network infrastructure elements, in the communication network 102. For example, an additional entity may be a network infrastructure element, say the router 110-2, that emits the event, say 108-1, or a component of the network infrastructure element, or a link between two neighboring network infrastructure elements, or a path between two network infrastructure elements that comprises multiple such links, etc., that causes a network infrastructure element to emit the event 108.

In an embodiment, the virtual network model 120 is coupled to a statistical knowledge base 132 that indicates, for each event e, a set of zero or more other events e' that are known to represent root causes for e and the conditions under which each e' is a root cause for e.

Embodiments permit creating root cause analysis rules or filters 122 and the identification of more complex patterns or scenarios. For example, root cause analysis rules may be created in the form of time window 124 as shown in FIG. 1; and each event type is associated with a configurable time window 124 that represents a maximum possible time difference between events 108 of that event type and a root cause (as indicated by other events 108). Based on such a time window 124, the event correlation engine 116, or the root cause analysis module 118, receives all events 108 within the time window 124 and treats only those events 108 as possible candidates to be a root cause for a network problem as indicated by a particular event type.

An ordered set of filters 122 may be applied to the candidate events 108 previously obtained, in order of the filters 122, to further reduce the size of the candidate event set. Events 108 can be filtered out for many reasons. Example reasons include events that are only symptoms and cannot be root causes, impossible relationships between events, etc.

Filters 122 can use information from the virtual network model 120 to reduce the number of candidates in the root cause candidate event set. For example, if the event type under analysis is OSPF neighbor lost, then a filter 122 may remove all events that are not on the path (at the time of the occurrence of the event) between the source and the lost neighbor. A similar concept can be applied for a device becoming unreachable, or a BGP neighbor lost. Thus, filters 122 can exploit the intimate knowledge of a network such as the communication network 102 of FIG. 1 that is provided by the virtual network model 120 and the knowledge base 132.

Filters 122 can be added to the system in design time or runtime. A possible enhancement can be the formalization of a language for specifying filters 122.

Filters 122 can be associated with a particular event type, or to a network scenario. The event correlation engine can recognize patterns of network events 108 that are associated with network scenarios, and then select a filter such as one of pattern filters 126 (as shown in FIG. 1, in some embodiments, the pattern filters 126 may be stored separately from the rest of filters 122) for the recognized scenario.

Filters can leverage the capabilities of the virtual network model 120, which offers an intimate understanding of the actual network 102 and the possible relations between events 108, according to the corresponding relation between the managed objects that are the sources for these events 108.

In an embodiment, after the filters 122 are applied, a min( ) function 128 is applied to find the most suitable root cause candidate event 108 among the events 108 in the root cause candidate event set.

In an embodiment, the min( ) function 128 determines whether a root cause candidate event 108 is a root cause of a specified event 108 based on one or more of the following factors: temporal relationships, such as the time difference between the root cause candidate event 108 and specified event 108; conditional probabilities that the root cause candidate event 108 is the root cause of the specified event 108; hop distance between the network infrastructure elements that generated the root cause candidate event 108 and the specified event 108; and others.

In an embodiment, the min( ) function 128 associates a non-negative value to each root cause candidate event 108 based on the foregoing factors. The min( ) function 128 then selects one root cause candidate having a minimal associated value as the root cause for the specified event 108.

In an embodiment, a value is determined for an event 108 according to the relation $(a1*P)+(a2*D)+(a3*T)$, wherein P denotes the conditional probability that an event 108 is a root cause of another event 108, based on the knowledge base 132 coupled with the virtual network model 120; D denotes a hop distance, as determined using (the topological information of the communication network 102 as stored in) the virtual network model 120, between a first network element that generated a first event 108 and a second network element that generated the root cause candidate event 108; and T denotes a time difference between the first event 108 and the root cause candidate event 108. The values a1, a2, and a3 are weight values that are derived empirically or from the knowledge base 132.

As an example of a conditional probability in the relation above, the conditional probability factor could address the question, given the fact that an "OSPF neighbor lost" event 108 has occurred at one network infrastructure element at a particular time, what is the probability that a "link down" event 108 is the root cause of the "OSPF neighbor lost" event 108.

Conditional probability information may be developed empirically and stored in the knowledge base 132 that is coupled to the event correlation engine 116. For example, in a laboratory setting or in a real network, a link can be taken down and the resulting events can be observed. Based on such observations, an administrator can determine and store in the knowledge base 132 the conditional probability that a "link down" event is the cause of other observed events.

In an embodiment, a generator module automatically creates and stores conditional probability values in the knowledge base 132, based on identifying events 108 that occur in the communication network 102 and resulting network events 108. In such an embodiment, the knowledge base 132 can be updated automatically and corrected based on actual network performance.

2.2 Candidate Elimination Based on Network Virtualization

If finding the cause for an event in the network is a search problem, then the search can be bounded by time to form a time window in which the cause must exist, and to reduce further the search space, an elimination process based on network virtualization is used. This elimination process can be utilized as a subsystem in a RCA engine. An effective elimination will result in much better accuracy of the root cause analysis.

In overview, in one embodiment, network virtualization is used to restrict the search of a cause by eliminating candidate causes that are irrelevant by network understanding. Generally, input comprises an Event, which is the handled event, and a Set of Events which are considered candidates as the immediate cause for the handled event; output comprises the set of events that could not be eliminated by network virtualization.

Figure 6:
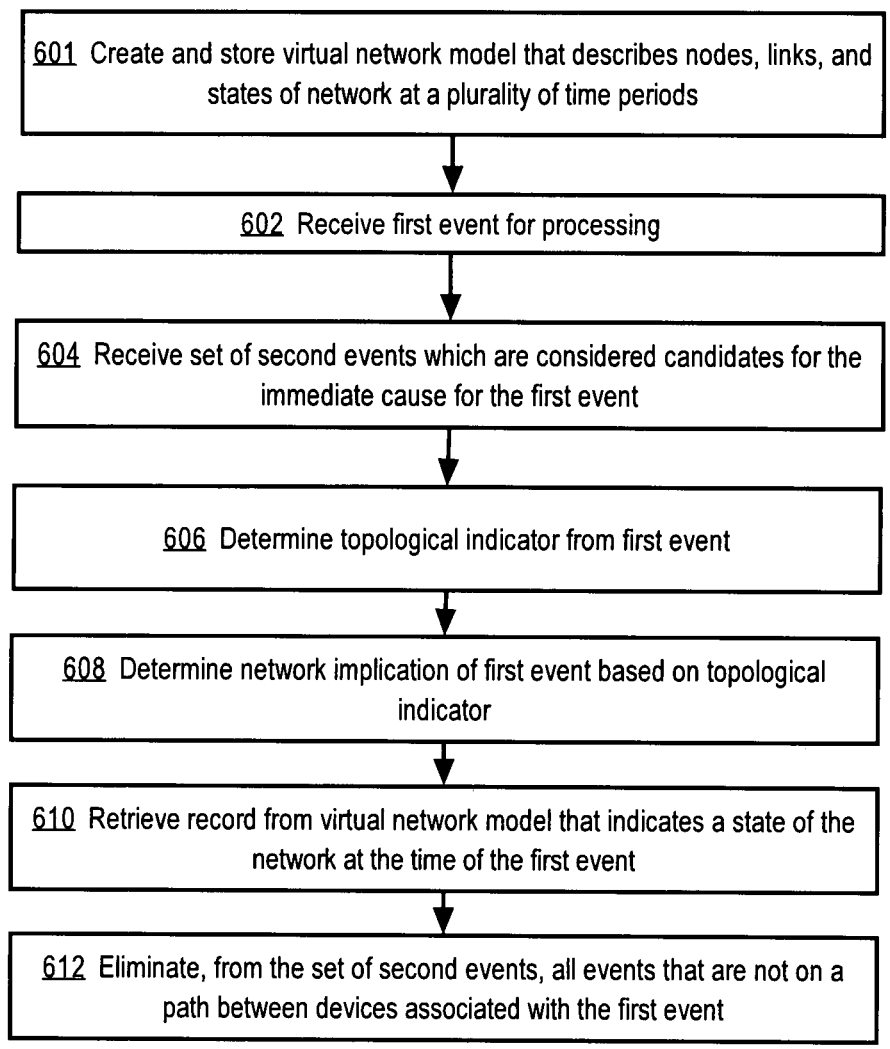
FIG. 6 illustrates a method of eliminating candidate events according to one strategy of one embodiment.

In various embodiments, various strategies for elimination based on network virtualization are provided. FIG. 6 illustrates a method of eliminating candidate events according to one strategy of one embodiment. The process of FIG. 6 may be implemented in a computer apparatus, in a software root cause analysis system, and in other ways.

In step 601, a virtual network model is created and stored. The virtual network model comprises a plurality of records that identify nodes, links, and states of nodes of links in a data processing network. Each record comprises a time value that indicates a time at which an actual network, which the virtual network model represents, had the nodes, links, and state values in the record. The structure and format of the virtual network model is not critical and existing virtual network model tools, software or approaches may be used.

In step 602, a first event is received for processing. At step 604, a set of second events, which are considered candidates for the immediate cause of the first event, is received.

In step 606, a topological indicator is determined from the first event. The topological indicator is any data in the event or received with the event that provides some topological hint about the event. For example, a topological indicator may be the name of the first event, such as BGP neighbor lost, device unreachable, OSPF neighbor lost, etc.

In step 608, the process determines a network implication of the first event based on the topological indicator. For example, an event indicating "BGP neighbor lost" means that there is no TCP connection between the two relevant devices, which means if a packet is sent on the path between the two devices it would not reach its destination. Therefore, an elimination process for such events could eliminate all events which do not lie on the path between the devices at the time the event occurred. The network implication may be determined based upon a look-up table or other mapping or knowledge base that associates topological indicators of events with network implications. Network implications may comprise code modules that are invoked when a particular topological indicator is identified.

The present approach benefits by using network virtualization. Since the network is rapidly changing, it is not possible to ask the network to identify the path between the two relevant devices at the time the event occurred. However, a virtual network can simulate sending a packet from a source to a destination at a given time t. In one embodiment, in step 610 a record is retrieved from the virtual network model that indicates a state of the network at the time of the first event. The first event is assumed to include a timestamp or other time value.

In step 612, all events that are not on a path between devices associated with the first event are eliminated from the set of second events. Thus, in steps 610-612, the virtual network is used to retrieve the network path between the two devices, and then an elimination algorithm can eliminate all events that are not on the retrieved path.

In an alternative embodiment, the elimination process can go one step further, as even some events on the path between the path between the relevant devices could be eliminated based on graph theory and networking theory. In another embodiment, the elimination subsystem could also 'consult' with the device in addition to the virtual network in order to obtain the current state of the network.

Figure 7:
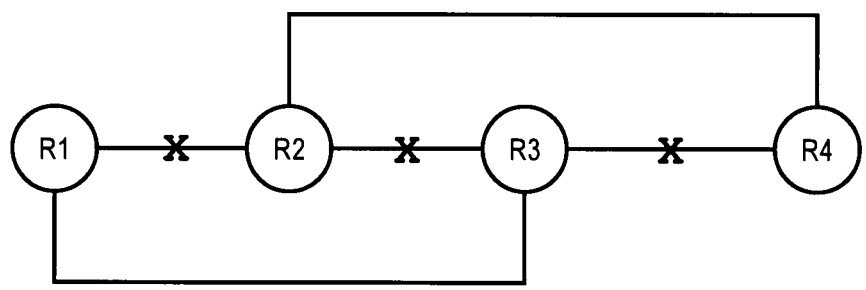
FIG. 7 illustrates a network for explaining an example of the use of FIG. 6.

FIG. 7 illustrates a network for explaining an example of the use of FIG. 6. A network of FIG. 7 comprises routers R1, R2, R3, and R4. R1 is coupled to R2 by a first link and is coupled to R3 by a second link. R2 is coupled to R3 by a first link and to R4 by a second link. R3 is coupled to R4 by one link. The "X" markings on links in FIG. 7 indicate that a root cause analysis system has received a set of the second events indicating that the links R1-R2, R2-R3, R3-R4 are down. In this scenario, several root cause events may have occurred. For example, it is possible that R1 has become unreachable for management traffic coming from the direction of R4. It is also possible that some BGP neighbor lost in the direction of R4. There is a need to eliminate one or more of the candidate events regardless of time issues and other effects.

In the scenario of FIG. 7, the link between R2-R3 could not have caused R1 to be unreachable under any circumstances. Therefore, the link R2-R3 can be eliminated from the candidate sources for the event of device unreachable on R1. To decide which events on the path could be eliminated, the process of Section 4 below may be used.

3.0 Performing Root Cause Analysis in a Communication Network 3.1 Example Operations To illustrate how root cause analysis in a communication network, such as network 102 of FIG. 1, can be performed by a network management system, such as network management system 104 of FIG. 1, in accordance with an embodiment, reference will now be made to an example. In the following discussion, reference will be made to the system diagram of FIG. 1, and to a flow diagram of FIG. 2. However, the broad techniques described herein for FIG. 2 are not limited to the context of FIG. 1.

Figure 2:
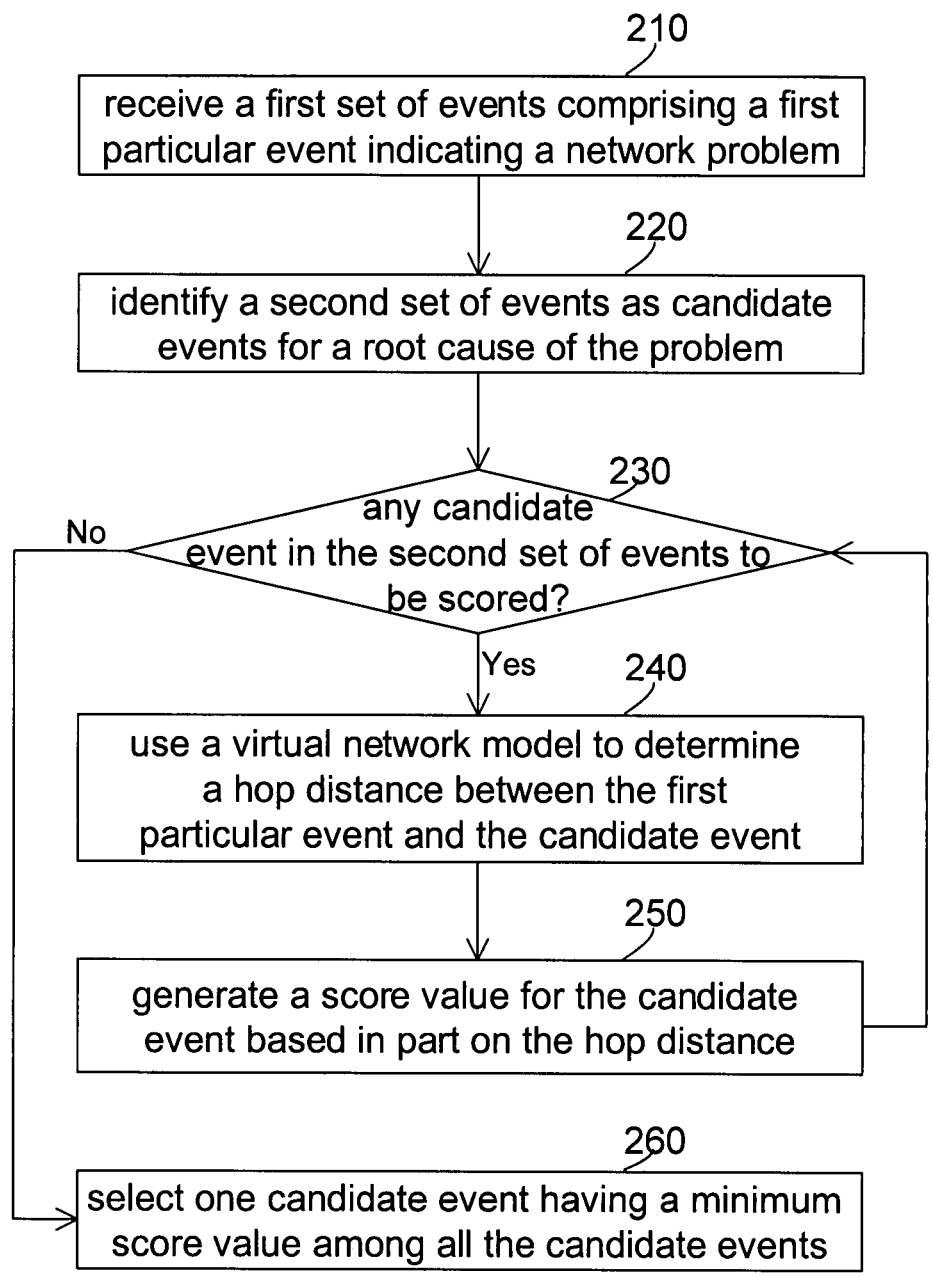
FIG. 2 illustrates an example process flow.

Initially, a first set of events 108 is received by the network management system 104 from the communication network 102 (step 210 of FIG. 2). The received events 108 comprise an event 108, say a first particular event 108, that indicates a problem in the network 102.

Next, the network management system 104 identifies, in the first set of events 108, a second set of events 108 as candidate events for a root cause of the problem in the network 102 (step 220 of FIG. 2). This identification may use a time window 124 associated with an event type to which the first particular event belongs and/or an event type to which a filtered event belongs. This identification may also use one or more filters 122 including pattern filter(s) 126, previously described.

A loop may be implemented to generate a score value for each candidate event in the second set of events, indicating how likely each such candidate event is the root cause of the problem reported by the particular event. More specifically, for each candidate event in the second set of events (step 230 of FIG. 2), the network management system 104 uses a virtual network model 120 of the network 102 (combined with information in the candidate event or the first particular event) to determine a hop distance between a particular network element that generated the first particular event and a second network element that generated the candidate event (step 240 of FIG. 2). A score value is generated by the network management system 104 for the candidate event 108 based in part on the hop distance previously determined (step 250 of FIG. 2).

If all the candidate events have been scored in the steps 240 and 250, the network management system 104 selects, in the second set of events, one candidate event having a minimum score value among all the candidate events as the root cause event for the problem reported by the first particular event (step 260 of FIG. 2).

To further illustrate how root cause analysis in a communication network, such as 102 of FIG. 1, can be performed by a network management system, such as 104 of FIG. 1, in accordance with an embodiment, reference will now be made to flow diagrams of FIG. 3 and FIG. 4.

Figure 3:
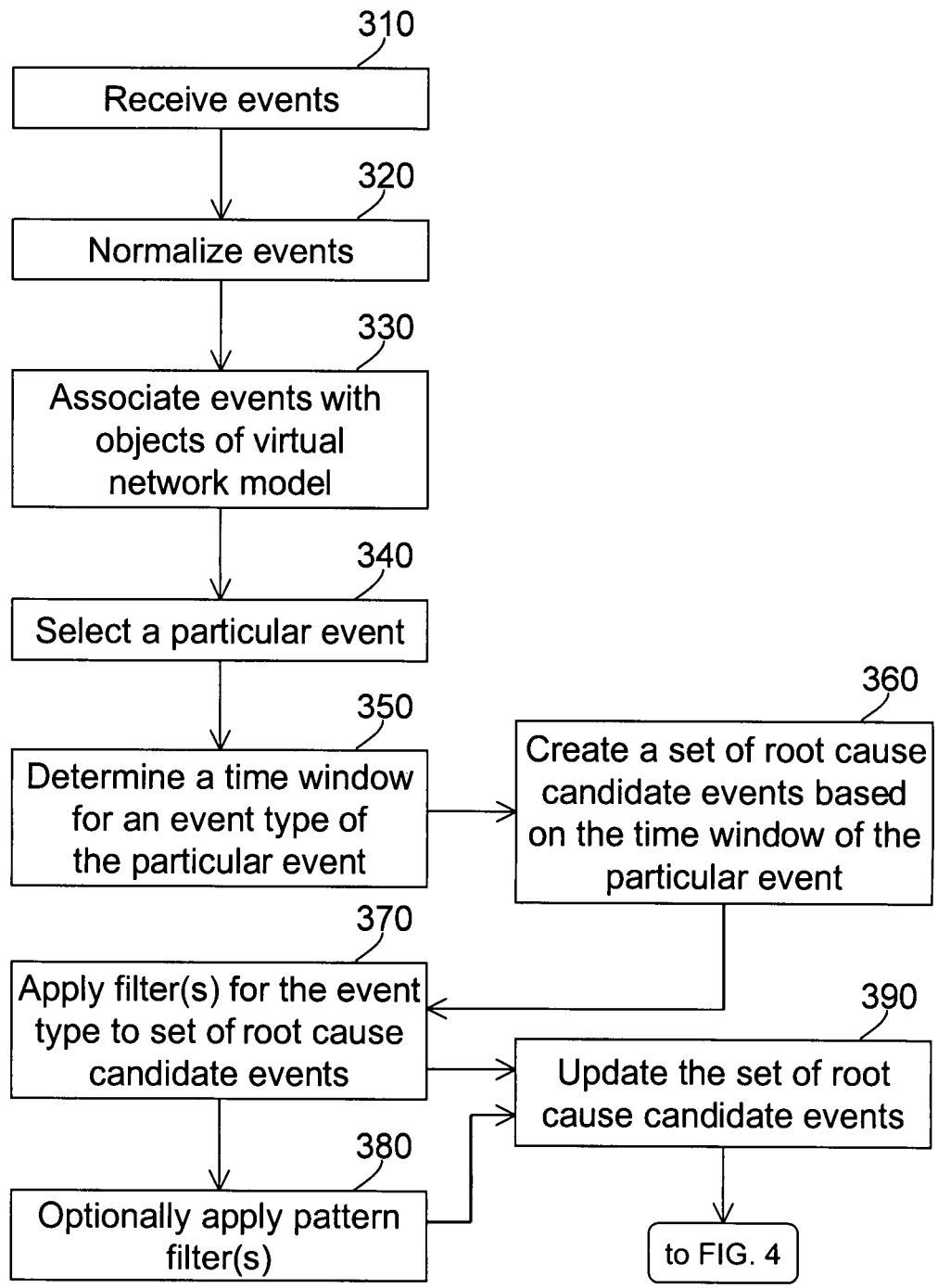
FIG. 3 illustrates another example process flow.

Initially, a first set of events 108 is received by the network management system 104 from the communication network 102 (step 310 of FIG. 3). The received events 108 comprise an event 108, say a first particular event 108, that indicates a problem in the network 102.

Next, the network management system 104, using the virtual network model coupled to the event correlation engine normalizes the received events, and associates them with model objects of the virtual network model (steps 320 and 330 of FIG. 3).

At step 340 of FIG. 3, the network management system 104 selects a particular event 108 for root cause analysis. In an embodiment, the network management system 104 also determines a time window for an event type of the particular event 108 (step 350 of FIG. 3). This time window may be used by the network management system 104 to create or identify a set of root cause candidate events based on the time window of the particular event. For example, if the particular event is a link down event, then a time window of three seconds may be set to only identify those events emitted by source entities within the time window from the time when the particular event happens and create a set of root cause candidate events based on that time window (step 360 of FIG. 3).

In some embodiments, once the set of root cause candidate events based on the time window of the particular event is created, the network management system 104 can apply zero or more filters that are associated with the event type of the particular event 108 to further reduce the number of candidate events for root cause (step 370 of FIG. 3). Optionally, the network management system 104 can apply one or more pattern filters previously discussed (step 380 of FIG. 3). In this manner, the set of root cause candidate events may be updated by the network management system 104 (step 390 of FIG. 3).

Figure 4:
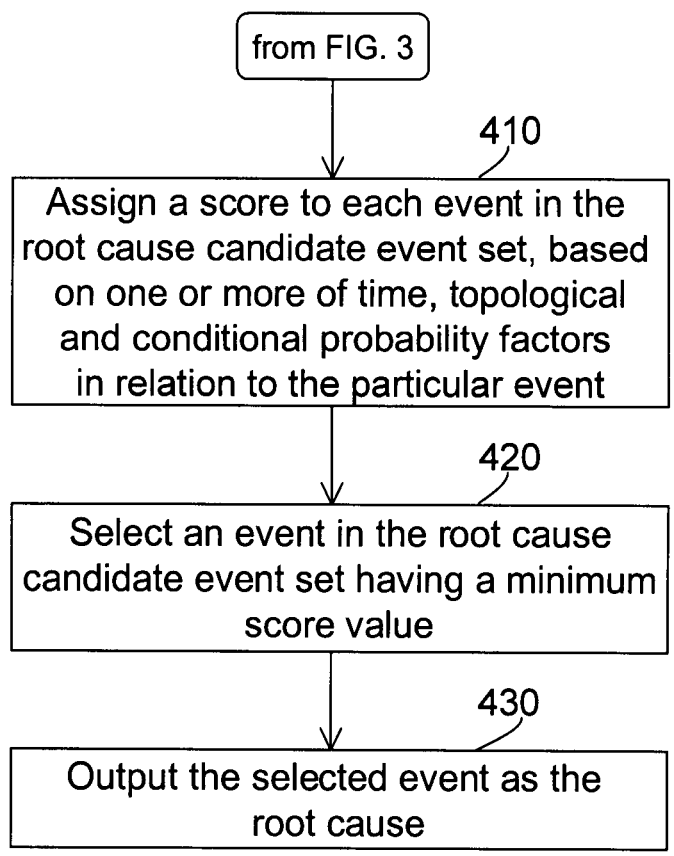
FIG. 4 illustrates further steps in the example process flow of FIG. 3.

For each of the remaining events in the set of root cause candidate events, the network management system 104 assigns a score based on one or more factors such as time (difference), topological distance and conditional probability in relation to the particular event 108 (step 410 of FIG. 4). At step 420, the network management system 104 selects an event in the set of root cause candidate events that has a minimum score value (step 420 of FIG. 4). That selected event is outputted by the network management system 104 as the root cause for the problem described by the particular event 108 (step 430 of FIG. 4).

3.2 Additional Features and Alternative Embodiments

In the preceding description, "link down" and "OSPF neighbor lost" are merely examples of events that can be considered, and embodiments can operate with a large number of different events.

In an embodiment, the min( ) function 128 is extensible. Additionally or alternatively, the min( ) function described herein can be applied to the filtered events to perform root cause analysis.

In one embodiment, the filters are applied to events by the event correlation engine 116 using the knowledge base 132 coupled with the virtual network model 120. Alternatively, other ways of applying filters to events can also be used. For example, an entity hosted in a network management station 114 or in a router 110 can poll other routers 110 and switches to obtain events 108, and filter the events 108 as described herein. Additionally or alternatively, the event correlation engine can obtain events from management information bases (MIBs) (for example, maintained by SNMP agents) in network infrastructure elements that are compatible with SNMP. Thus, all variations of using filters in conjunction with the virtual network model 120 and the knowledge base 132 may be used.

In some embodiments, virtual network model 120 may be maintained in one or more data stores such as those provided by main memory of one or more computing devices or by any other types of memory space in the network management system 104. In some embodiments, the knowledge base 132 coupled with the virtual network model may be constructed based on persistent stored information in a data base 130. In various embodiments, other information such as the time windows 124, the filters 122 including the pattern filters 126, parameters for the min( ) function 128, etc., may be stored in a data base such as 130 of FIG. 1.

The network management system 104 may be separate from the communication network 102. Alternatively, other configurations of the network management system 104 and/or the communication network 102 may be used. For example, in an embodiment, the network management system 104 may be implemented on one or more computing devices that are a part of the communication network 102. Thus, various network configurations in various embodiments interoperating with a virtual network model or with actual network devices may be used.

Embodiments may be used to perform event correlation in general and without performing root cause analysis. For example, the filtering approach described above can be arranged as a method of filtering events in a telecommunications network comprising receiving a first event from the network; receiving one or more other events from the network; and for each of the other events, applying one or more filters to result in creating and storing one or more filtered events. In this approach, at least one of the filters is operable to pass only such other events that originate from a second network element that generated such other events and that is topologically close in the virtual network to a first network element that generated the first event. For example, it may be determined that the second network element is within a set number of hops from the first network element. The set number of hops may be configurable. In an embodiment, the set number of hops that indicate a topological closeness has a default value of two hops. Filters based on an event time window or conditional probabilities also may be used in such an approach.

Various other features may be included, and various other modifications may be made, to the embodiments of the techniques for performing root cause analysis in a communication network described herein. Thus, the embodiments described herein are to be regarded in an illustrative rather than a restrictive sense.

4.0 Root Cause Candidate Elimination

According to an embodiment, a process can be used as an elimination step during root cause analysis, resulting in eliminating some events from a candidate event set. In an embodiment, during root cause analysis of an event, if the event under analysis relates to network topology, then the process herein can be applied. In an embodiment, the process uses a directed acyclic graph to represent a data processing network. The process may be applied after translating the analyzed event to a source point and a destination point in the graph, in which the destination point is not reachable from the source point. The elimination of candidate events is based upon the fact that each one of the paths from the source point to the destination point is "broken" in some sense.

In an embodiment, the directed graph representing the network is marked so that the source point and destination point of the event under analysis are denoted as a source node and destination node. Edges in the graph represent links between points or nodes in the network. Each event in the candidate event set represents a particular "broken" edge on the graph.

All paths in the graph from source node to destination node are analyzed. For each path it is possible to determine which events from the candidate event set cannot be eliminated. Certain "broken" edges on the path, which cannot be bypassed via a path with no broken edges, cannot be eliminated from the candidate event set.

In one embodiment, the formal definition of inputs and outputs in a candidate elimination process are:

Input:

Directed acyclic graph G = (V, E)
V→vertices
E→edges
S ⊆ E colored in red
Source s, destination d, where s, d ∈ V Output:

Let P = $\{P_1 \ldots P_n\}$ be all paths from s to d.
Each path $P_m$ = {s, . . . , d} is an ordered list of vertices from V.
An edge e = $(v_i, v_j) \in S \notin R$ iff $\forall P_m \in P$
Either: $v_i$ is not followed immediately by $v_j$ on $P_m$
Or $P_m = \{v_i, \ldots, v_{i-1}, v_i, v_j, v_{j+1}, \ldots, v_l\}$, and there exist
k ≤ i, j ≤ l forming a path $\{v_k, \ldots, v_l\}$ in G having no red edges.

A process having the preceding formal description may be implemented in a computer apparatus comprising software, hardware, firmware, or a combination thereof. For example, a computer system may comprise a root cause elimination unit having logical gates or other hardware elements that are configured to implement the preceding process. Alternatively, the process formally described above may be implemented in one or more computer programs or other software elements, alone or in combination with a data repository such as a database or other data storage system.

Figure 8A:
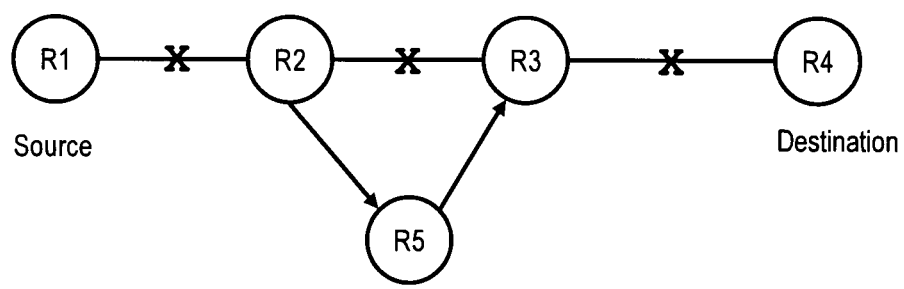
FIG. 8A, 8B, 8C illustrate network arrangements according to various embodiments.
Figure 8B:
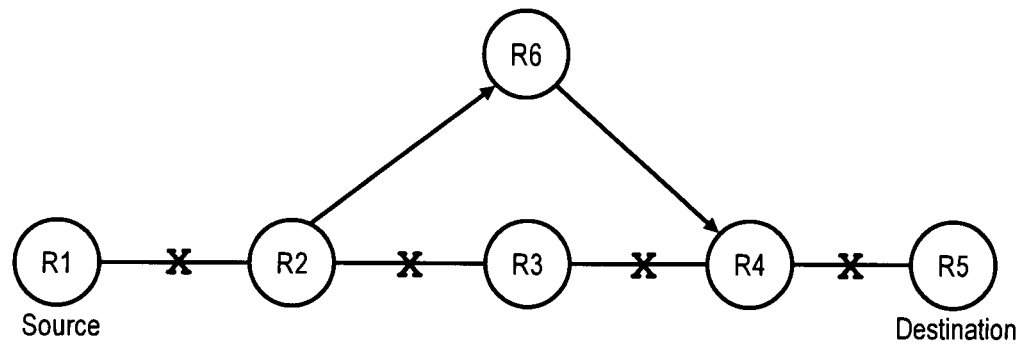
Figure 8C:
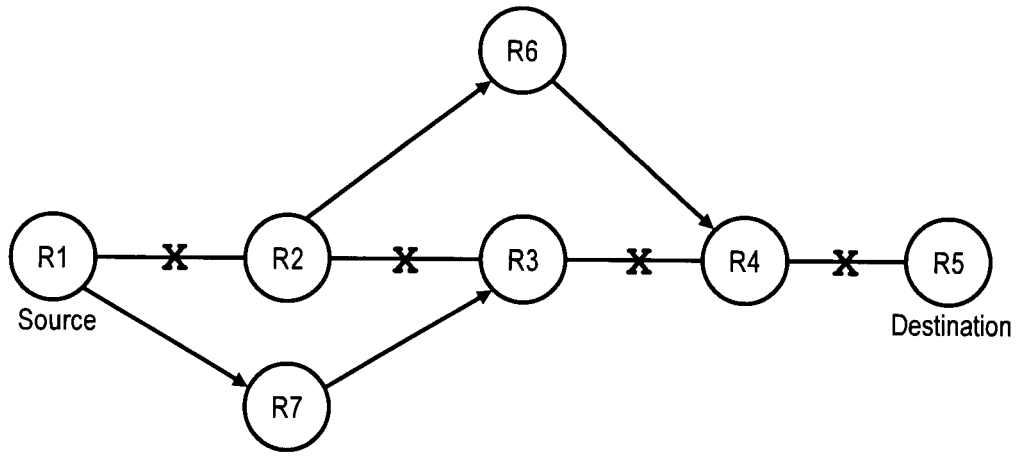

The operation of the preceding process is now described with reference to FIG. 8A, 8B, 8C. FIG. 8A, 8B, 8C illustrate network arrangements according to various embodiments. In FIG. 8A, 8B, 8C, edges marked with an "X" symbol are members of a candidate set S.

FIG. 8A illustrates a first example of output for a first graph. In FIG. 8A, R contains edges (1,2) and (3,4). Edge (2,3) does not belong to R, because for all paths on which it appears (e.g., path 1-2-3-4), a part of the path containing the edge (path from 2 to 3) can be replaced by a path that does not contain any edges from S (path 2-5-3).

FIG. 8B illustrates a second example of output for a second graph. R contains edges (1,2) and (4,5). Edges (2,3) and (3,4) do not belong to R, since for all paths they appear on (e.g., path 1-2-3-4-5) a part of the path containing the edges (path from 2 to 4) can be replaced by a path that does not contain any edges from S (path 2-6-4).

FIG. 8C illustrates a third example of output for a third graph. R contains edges (1,2), (3,4), and (4,5). Edge (2,3) does not belong to R, since for all paths it appears on (e.g., path 1-2-3-4-5), there exists a part of the path containing the edge (either path 1-2-3 or path 2-3-4) that can be replaced by a path that does not contain any edges from S (either path 1-7-3 or path 2-6-4).

However, edge (1,2) belongs to R, since path 1-2-6-4-5 contains it, and there is no part of the path containing it that can be replaced by a path with no edges or nodes from S on it. Edge (3,4) belongs to R since path 1-7-3-4-5 contains it and there is no part of the path containing it that can be replaced by a path with no edges or nodes from S on it.

According to an embodiment, a root cause candidate elimination process comprises the following steps.

1. Find P=$\{P_1 \ldots P_n\}$, which is a list of all paths in G from s to d.

2. Determine A[1 . . . q] so A[i] contains a list of all vertices reachable from $v_i$ through a path with no red edges.

3. $\forall P_m = \{v_1, \ldots, v_{i-1}, v_i, v_j, v_{j+1}, \ldots, v_t\} \in P$, find all e=$(v_i, v_j) \in$ S for which not exist k,l such that k≤i, j≤l and G contains a path $\{v_i, \ldots, v_j\}$ with no red edges. This step can involve iterating through the path and removing all vertices between $v_a$ and $v_b$ if $v_b$ is reachable from $v_a$ through a path with no red edges based on step 1. Edges from S remaining on the path, after all removals are performed, are added to R.

FIG. 9 illustrates computer program pseudo-code that may be used as the basis of an implementation of the preceding process may be implemented in computer program code.

Thus, a process for eliminating candidate events in root cause analysis in network management has been described. The use of network virtualization, in the form of a virtual network model or graph, as an elimination tool in the process of root cause analysis, generally or specifically with the elimination process herein, yields better accuracy in the identification of the cause. The benefit of accuracy occurs because the solution herein is not based on statistical models, but is based on accurate topological information obtained from events. The approach herein also supports duplicity in the network; that is, duplicate IP addresses, duplicate VLAN IDs, etc. may occur in events without affecting operation of the process.

In one embodiment of the approach herein, the virtual network model or graph provides a snapshot of the network, at least in terms of routing paths, at any instance of time. The approach then finds the path that data could have traversed at a given time instance. Finding such a path is possible because the virtual network model represents the topology of the network at that time, and routing information at that time. Then, given the determined path, the process projects the event set onto the path and filters all events that are not on that path, because such events cannot be the root cause based on the fact that the path does not exist now.

In an embodiment, the ability to perform "rewinding" the virtual network, or its routing related components, to the point in time that can support analysis of root causes, supports the process herein. In an embodiment, the virtual network model is updated periodically or in real time by following changes that occur in the network based on routing updates, change events, etc. Virtual network model data may be saved in memory on a virtual network element (VNE). When performing a filtering task, the process herein takes a time value for an event and uses the time value to analyze the virtual network according to the state of the virtual network at a given time.

5.0 Implementation Mechanisms—Hardware Overview

Figure 5:
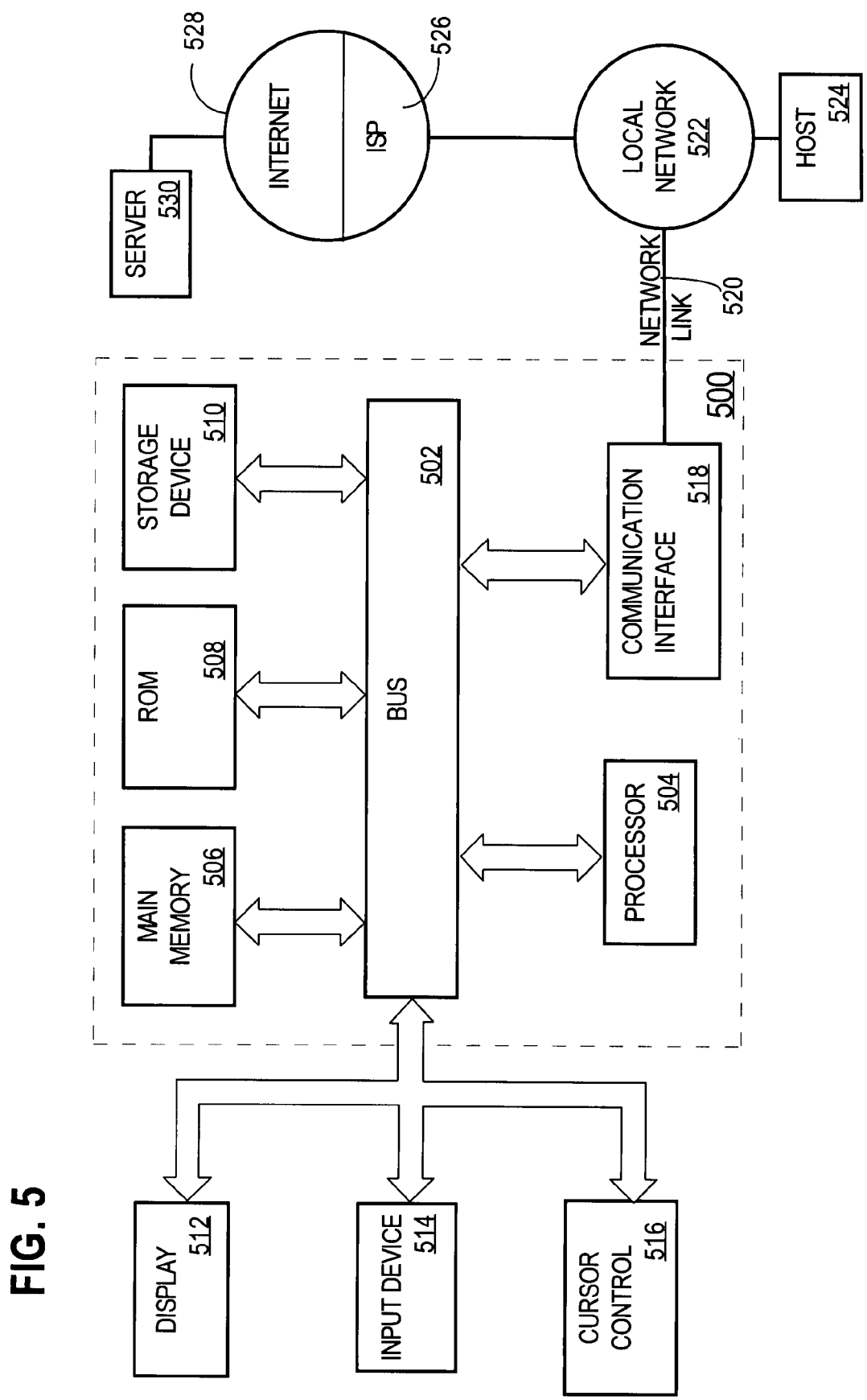
FIG. 5 illustrates a computer system.

FIG. 5 illustrates a computer system 500 upon which embodiments of the techniques for performing root cause analysis in a communication network may be implemented. A preferred embodiment is implemented using one or more computer programs running on computer system 500, which is operatively coupled to the backplane of a network infrastructure element such as, for example, a router or a switch.

Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In an embodiment, computer system 500 is used for performing root cause analysis in a communication network. According to this embodiment, root cause analysis in a communication network is performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry or other hardware-based logic may be used in place of or in combination with software instructions. Thus, embodiments are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In an embodiment, one such downloaded application performs root cause analysis in a communication network as described herein.

The received code may be executed by processor 504 as it is received, and/or stored in storage device 510, or other non-volatile storage for later execution. In this manner, computer system 500 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method, comprising:
creating and storing a virtual network model that describes nodes and links of a data processing network at a plurality of time periods;
receiving from the network a first event that indicates a problem in the network and a time value specifying a time at which the first event occurred;
receiving a set of second events comprising candidates for a root cause of the first event;
wherein each individual event of the set of second events and the first event is received from a network element in the network in response to state changes or attribute changes of one or more entities within the network element;
determining a network topological indicator from the first event;
wherein the network topological indicator is based on a topology related protocol specified in the first event;
determining a network implication of the first event based on the topological indicator;
wherein the network implication indicates connectivity issues potentially causing the first event based on the topology related protocol;
based on the network implication and the time value of the first event, retrieving data from the virtual network model that indicates a path between nodes that were associated with the first event at the time at which the first event occurred;
removing, from the set of second events, all events that are not on the path between the nodes that were associated with the first event at the time at which the first event occurred;
wherein the method is performed by one or more computing devices.

2. The method of claim 1 wherein the virtual network model comprises a directed acyclic graph.

3. The method of claim 1 wherein the topological indicator specifies that a device is unreachable or a Border Gateway Protocol (BGP) neighbor is lost.

4. The method of claim 1 further comprising translating the first event to a source point and a destination point in the virtual network model, wherein the destination point is not reachable in the network from the source point.

5. The method of claim 2 wherein each of the second events represents a broken edge of the graph.

6. The method of claim 2, wherein the virtual network model comprises a directed acyclic graph, further comprising translating the first event to a source point and a destination point in the virtual network model, wherein the destination point is not reachable in the network from the source point, and wherein the retrieving and removing includes processing all paths in the graph from the source point to the destination point.

7. A computer-implemented method, comprising:
creating and storing a directed acyclic graph $G=(V, E)$ that describes nodes and links of a data processing network at a plurality of time periods, wherein V comprises vertices and E comprises edges, and wherein a set $S \subset E$ is marked in the graph;
receiving from the network a first event that indicates a problem in the network;
receiving a set of second events comprising candidates for a root cause of the first event;
determining a network topological indicator from the first event;
determining a network implication of the first event based on the topological indicator;
determining for the first event a source s and a destination d, wherein $s, d \in V$;
creating and storing path data $P=\{P_1 \ldots P_n\}$ comprising all paths from s to d and wherein each path $P_m=\{s, \ldots, d\}$ is an ordered list of vertices from V;
creating and storing edge data $e=(v_i, v_j) \in S \notin R$ iff $\forall P_m \in P$;
determining whether $v_i$ is not followed immediately by $v_j$ on $P_m$ or $P_m=\{v_1, \ldots, v_{i-1}, v_i, v_j, v_{j+1}, \ldots, v_t\}$, and exist $k \leq i$, $j \leq l$ forming a path $\{v_k, \ldots, v_l\}$ in G having no marked edges, by iterating through the path and removing all vertices between $v_a$ and $v_b$ if $v_b$ is reachable from $v_a$ through a path with no marked edges;
creating and storing a set R of events that cannot be eliminated comprising edges from S remaining on the path, after all removals are performed;
wherein the method is performed by one or more computing devices.

8. An apparatus comprising:
one or more processors coupled to memory;
wherein the one or more processors are configured to perform:
creating and storing a virtual network model that describes nodes and links of a data processing network at a plurality of time periods;

receiving from the network a first event that indicates a problem in the network and a time value specifying a time at which the first event occurred;

receiving a set of second events comprising candidates for a root cause of the first event;

wherein each individual event of the set of second events and the first event is received from a network element in the network in response to state changes or attribute changes of one or more entities within the network element;

determining a network topological indicator from the first event; wherein the network topological indicator is based on a topology related protocol specified in the first event;

determining a network implication of the first event based on the topological indicator;

wherein the network implication indicates connectivity issues potentially causing the first event based on the topology related protocol;

retrieving from the virtual network model, based on the network implication and the time value of the first event, data that indicates a path between nodes that were associated with the first event at the time at which the first event occurred;

removing, from the set of second events, all events that are not on the path between the nodes that were associated with the first event at the time at which the first event occurred.

9. The apparatus of claim 8 wherein the virtual network model comprises a directed acyclic graph.

10. The apparatus of claim 8 wherein the topological indicator specifies that a device is unreachable or a Border Gateway Protocol (BGP) neighbor is lost.

11. The apparatus of claim 8 wherein the one or more processors are further configured to perform: translating the first event to a source point and a destination point in the virtual network model, wherein the destination point is not reachable in the network from the source point.

12. The apparatus of claim 9 wherein each of the second events represents a broken edge of the graph.

13. The apparatus of claim 9, wherein the virtual network model comprises a directed acyclic graph, further comprising translating the first event to a source point and a destination point in the virtual network model, wherein the destination point is not reachable in the network from the source point, and wherein the retrieving and removing includes processing all paths in the graph from the source point to the destination point.

14. A non-transitory computer-readable storage medium comprising one or more sequences of instructions which when executed by one or more processors causes the one or more processors to perform:

create and store a virtual network model that describes nodes and links of a data processing network at a plurality of time periods;

receive from the network a first event that indicates a problem in the network and a time value specifying a time at which the first event occurred;

receive a set of second events comprising candidates for a root cause of the first event;

wherein each individual event of the set of second events and the first event is received from a network element in the network in response to state changes or attribute changes of one or more entities within the network element;

determine a network topological indicator from the first event;

wherein the network topological indicator is based on a topology related protocol specified in the first event;

determine a network implication of the first event based on the topological indicator;

wherein the network implication indicates connectivity issues potentially causing the first event based on the topology related protocol;

based on the network implication and the time value of the first event, retrieving data from the virtual network model that indicates a path between nodes that were associated with the first event at the time at which the first event occurred;

remove, from the set of second events, all events that are not on the path between the nodes that were associated with the first event at the time at which the first event occurred.

15. A computer system comprising:

a computing device;

a non-transitory computer-readable storage medium comprising one or more sequences of instructions which when executed by one or more processors causes the one or more processors to perform:

create and store a virtual network model that describes nodes and links of a data processing network at a plurality of time periods;

receive from the network a first event that indicates a problem in the network and a time value specifying a time at which the first event occurred;

receive a set of second events comprising candidates for a root cause of the first event;

wherein each individual event of (a) the set of second events and (b) the first event is received from a network element in the network in response to state changes or attribute changes of one or more entities within the network element;

determine a network topological indicator from the first event;

wherein the network topological indicator is based on a topology related protocol specified in the first event;

determine a network implication of the first event based on the topological indicator;

wherein the network implication indicates connectivity issues potentially causing the first event based on the topology related protocol;

based on the network implication and the time value of the first event, retrieving data from the virtual network model that indicates a path between nodes that were associated with the first event at the time at which the first event occurred;

remove, from the set of second events, all events that are not on the path between the nodes that were associated with the first event at the time at which the first event occurred.

16. The system of claim 15 wherein the virtual network model comprises a directed acyclic graph.

17. The system of claim 15 wherein the topological indicator specifies that a device is unreachable or a Border Gateway Protocol (BGP) neighbor is lost.

18. The system of claim 15, wherein the one or more sequences of instructions further comprise instructions which when executed by one or more processors causes the one or more processors to perform translating the first event to a source point and a destination point in the virtual network model, wherein the destination point is not reachable in the network from the source point.

19. The system of claim 16 wherein each of the second events represents a broken edge of the graph.

20. The system of claim 16, wherein the virtual network model comprises a directed acyclic graph, and wherein the one or more sequences of instructions further comprise instructions which when executed by one or more processors causes the one or more processors to perform translating the first event to a source point and a destination point in the virtual network model, wherein the destination point is not reachable in the network from the source point, and wherein the logic to retrieve and remove includes processing all paths in the graph from the source point to the destination point.

* * * * *